(12) United States Patent
Schell et al.

(10) Patent No.: US 11,101,629 B2
(45) Date of Patent: Aug. 24, 2021

(54) BUSBAR HOLDER AND CORRESPONDING ARRANGEMENT

(71) Applicant: RITTAL GMBH & CO. KG, Herborn (DE)

(72) Inventors: Michael Schell, Dillenburg-Niederscheid (DE); Sven Zirkler, Andernach (DE); Christian Moritz, Bad Marienberg (DE)

(73) Assignee: RITTAL GMBH & CO. KG

( * ) Notice: Subject to any disclaimer, the term of this patent is extended or adjusted under 35 U.S.C. 154(b) by 240 days.

(21) Appl. No.: 16/346,924

(22) PCT Filed: Sep. 12, 2017

(86) PCT No.: PCT/DE2017/100769
§ 371 (c)(1),
(2) Date: May 2, 2019

(87) PCT Pub. No.: WO2018/082728
PCT Pub. Date: May 11, 2018

(65) Prior Publication Data
US 2019/0280471 A1    Sep. 12, 2019

(30) Foreign Application Priority Data
Nov. 4, 2016 (DE) ..................... 10 2016 121 074.9

(51) Int. Cl.
*H02G 5/00* (2006.01)
*H02G 5/04* (2006.01)
(Continued)

(52) U.S. Cl.
CPC .................. *H02G 5/04* (2013.01); *H02B 1/06* (2013.01); *H02G 5/025* (2013.01)

(58) Field of Classification Search
CPC .............. H02G 5/04; H02G 5/025; H02B 1/06
See application file for complete search history.

(56) References Cited

U.S. PATENT DOCUMENTS 4,727,220 A    2/1988 Wagener
5,829,995 A *  11/1998 Rischard ................. H02B 1/21
                                                       439/212
(Continued)

FOREIGN PATENT DOCUMENTS

DE    2556307 A1    6/1977
DE    8208760 U1    7/1982
(Continued)

OTHER PUBLICATIONS

DE 4005138 A1 English Translation (Year: 1990).*
(Continued)

*Primary Examiner* — Pete T Lee
(74) *Attorney, Agent, or Firm* — Harness, Dickey & Pierce, P.L.C.

(57) ABSTRACT

The invention relate to a bus bar holder having a bottom part and a top part detachably connected to the bottom part, between which, when they are connected together, at least one busbar passage is formed, wherein the top part and the bottom part have, on mutually opposite contact surfaces, sliding faces along which they bear against one another and are movable between an open position, in which the top part can be lifted off the bottom part, and a closed position, in which the top part is secured to the bottom part via a tongue-and-groove connection, wherein a releasable latching pawl secures the top part and the bottom part in the closed position. Also described is a corresponding arrangement made up of at least one such busbar holder and at least one busbar.

13 Claims, 7 Drawing Sheets

(51) Int. Cl.
*H02B 1/06* (2006.01)
*H02G 5/02* (2006.01)

(56) References Cited

U.S. PATENT DOCUMENTS

| | | | |
|---|---|---|---|
| 6,549,428 B1 * | 4/2003 | Fontana | H02B 1/20 |
| | | | 174/71 B |
| 2003/0036297 A1 * | 2/2003 | Kilkenny | H01R 25/145 |
| | | | 439/110 |

FOREIGN PATENT DOCUMENTS

| | | |
|---|---|---|
| DE | 8230599 U1 | 2/1983 |
| DE | 8609413 U1 | 8/1986 |
| DE | 3601988 C2 | 4/1989 |
| DE | 4005138 A1 | 10/1990 |
| DE | 10200504427 B4 | 5/2007 |
| EP | 1193822 B1 | 1/2004 |

OTHER PUBLICATIONS

DE 8208760 U1 English Translation (Year: 1982).*
International Search Report (in English and German) and Written Opinion (in German) issued in PCT/DE2017/100769, dated Nov. 17, 2017; ISA/EP.

\* cited by examiner

BUSBAR HOLDER AND CORRESPONDING ARRANGEMENT

CROSS-REFERENCE TO RELATED APPLICATIONS

This application is a 371 U.S. National Stage of International Application No. PCT/DE2017/100769, filed on Sep. 12, 2017, which claims priority to German Application No. 10 2016 121 074.9, filed on Nov. 4, 2016. The entire disclosures of the above applications are incorporated herein by reference.

BACKGROUND

This section provides background information related to the present disclosure which is not necessarily prior art.

TECHNICAL FIELD

The invention relates to a busbar holder having a bottom part and a top part detachably connected with the bottom part, between which, when they are connected with each other, at least one busbar passage is formed. Such a busbar passage is known from DE 10 2005 044 127 B4. Similar busbar holders are also described by EP 1 193 822 B1, DE 36 01 988 C2, DE 82 30 599 UI, and DE 86 09 413 UI.

DISCUSSION

The busbar holders known from the prior art have the disadvantage that they are comparatively complicated to use, which is caused in particular by the fact that after insertion of the at least one busbar into the busbar passage formed between the bottom part and the top part, the bottom part must be screwed to the top part by multiple bolts in order to hold the busbar firmly in the busbar passage.

SUMMARY

This section provides a general summary of the disclosure, and is not a comprehensive disclosure of its full scope or all of its features.

It is therefore the aspect of the invention to develop a busbar of the type described above such that it is easy to use.

It is accordingly provided with a busbar holder that the top part and the bottom part have sliding faces on opposite bearing sides along which they bear against one another, and, between an open position in which the top part can be lifted off from the bottom part, and a closed position in which the top part is fixed through a tongue-and-groove connection to the bottom part, they are displaceable relative each other, wherein a releasable latching pawl determines the top part and the bottom part relative to each other in the closed position. For example, between the open position and the closed position, the top part and the bottom part are displaceable relative to each other in a defined linear movement, e.g. in the longitudinal direction or the transverse direction of the busbar.

Therefore, in place of formation of a screw connection between the top part and the bottom part of the busbar holder it is proposed that the top part and the bottom part be fixed to each other by a combination of a tongue-and-groove connection and a releasable latching connection. The mounting of at least one busbar in the busbar holder is therefore possible without tools. It can be provided that the re-release of the latching pawl to be able to move the bottom part and the top part from the closed position to the open position requires the use of a tool, such as a screwdriver, to avoid an inadvertent re-release of the bottom part and top part from the closed position.

One groove of the tongue-and-groove connection can be formed as at least one T-shaped and L-shaped projection that extends from the support side of the part of the top part and bottom part having the T-shaped or L-shaped projection. The projection can extend substantially perpendicular to the support side. The projection can have at least one projecting hook at a free end. The hook can extend parallel to the support side and, for example, in the longitudinal direction of the busbar holder, in particular in the longitudinal direction of the top part or the bottom part, or perpendicular thereto. In particular, the projection can have a crosspiece that extends perpendicular to the support side and is formed with a first end on the support side, and a second end opposite the first end on which at least one hook extending in the longitudinal direction of the busbar holder or perpendicular to it is formed. It is understandable that the nature of the formation of the tongue-and-groove connection, in particular the formation of the geometries forming the tongue and the groove, depends on the adjustment direction of the top part and bottom part to each other in which these should be fixed to each other or released from each other.

The T-shaped or L-shaped projection can extend into a recess of the respective other part of the top part and bottom part, wherein the projection in the closed position engages an undercut of the recess and wherein the projection in the open position is isolated with respect to the undercut so that in the open position the top part can be lifted from the bottom part and in the closed position the top part is fixed to the bottom part.

The part of the top part and bottom part having the recess on an outer side can have a passage ending in the undercut. Therefore, the undercut can serve as a viewing window to be able to check in the closed position whether the projection properly engages the undercut so that the top part and bottom part are securely fixed to each other.

The releasable latching pawl can project from a first of the two opposing support sides and in the closed position be received in a latching receptacle in a second of the two opposite support sides.

The part of the top part and bottom part having the latching receptacle on an outer side can have a tool insertion opening ending in the latching receptacle. Through the tool insertion opening it is possible, for example with the aid of a screwdriver, to prestress the latching pawl in the closed position of the busbar holder enough that it no longer engages the latching receptacle so the top part is displaceable relative to the bottom part in order to move the two parts to the open position in which the top part can be lifted from the bottom part.

The bottom part can have a mounting side opposite its support side for mounting of the bottom part on a base, wherein a screw channel extends between the support side and the mounting side that on the mounting side is closed by a positioning pin that projects from the screw channel and protrudes over the mounting side. The positioning pin makes it possible to align the busbar holder, in particular the bottom part of the busbar holder, with respect to a base on which the busbar holder is to be mounted; for example, such that the at least one screw channel in the bottom part is aligned with a corresponding bore or a passage in the base on which the busbar holder should be mounted.

The positioning pin can be mounted in the mounting side detachably, and preferably through a predetermined breaking point. In this way it is possible, after aligning the busbar holder with respect to the base, to break the positioning pin out of the screw channel such that the screw channel is exposed for the passage of a bolt or the like.

For example, the bottom part of the busbar holder can have at least two screw channels of which one has a positioning pin of the type described above. In a first step, with the aid of the positioning pin the bottom part of the busbar holder can be pre-aligned with respect to the base on which the busbar holder should be mounted. Once the pre-alignment is done, the bottom part of the busbar holder can be screwed by a bolt or the like through the at least one more screw channel, which has no positioning pin. In another step the positioning pin can be broken out of the other screw channel to—through the screw channel thus made free—mount the bottom part of the busbar holder through another mounting point on the base.

For example, the positioning pin can be mounted through a predetermined breaking point to the inner circumference of an annular flange arranged inside the screw channel bordering the mounting side and preferably aligned with the mounting side.

The cross-section of the at least one busbar passage can be formed by the cross-section of the busbar receptacle in the bottom part, wherein the busbar receptacle is sealed from the support side of the top part if the top part and the bottom part are connected with each other. In this embodiment the busbar is thus fully received in the bottom part of the busbar holder, wherein the top part merely forms another upper cover of the busbar receptacle formed in the bottom part. As a result, the top part can be designed as a comparatively simple top part with a substantially level support side. In addition, through this embodiment it is possible that with a busbar inserted into the busbar receptacle of the bottom part, the top part and bottom part with adjacent sliding faces are also displaceable relative to each other on the opposite support sides to be able to adjust the top part and the bottom part between the closed position and the open position. In addition, with this embodiment a longitudinal side of the busbar inserted into the busbar receptacle in the bottom part can align with the sliding face of the bottom part so that the sliding face of the bottom part and the longitudinal side of the busbar form a level sliding face along which the top part is adjustable between the closed position and the open position.

The top part on its outer side for each busbar receptacle can have a mark identifying the position of the busbar receptacle. The mark can be made as a recess in the top side of the top part.

Given the restrictions named above, the geometry of the busbar passage and busbar receptacle cannot be limited to any particular geometries, and because of the invention's simple design of top part and bottom part can be geared to the geometry of a receiving busbar, which does not necessarily mean that the geometry of busbar passage and busbar receptacle corresponds to the outer geometry of a receiving busbar. Preferably, however, the geometry of busbar passage and busbar receptacle is rectangular, wherein, for example, a long side of the busbar passage and busbar receptacle can extend in the longitudinal direction of the busbar holder or perpendicular to it.

Accordingly, given an arrangement of a busbar holder of the type described above and at least one busbar, the busbar can be inserted into the busbar receptacle in the bottom part, wherein an outer profile side of the busbar aligns with the sliding face of the bottom part and rests on the sliding face of the top part when the top part and bottom part are connected with each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are illustrated by the following figures in which are shown:

DETAILED DESCRIPTION

Example embodiments will now be described more fully with reference to the accompanying drawings.

Figure 1:
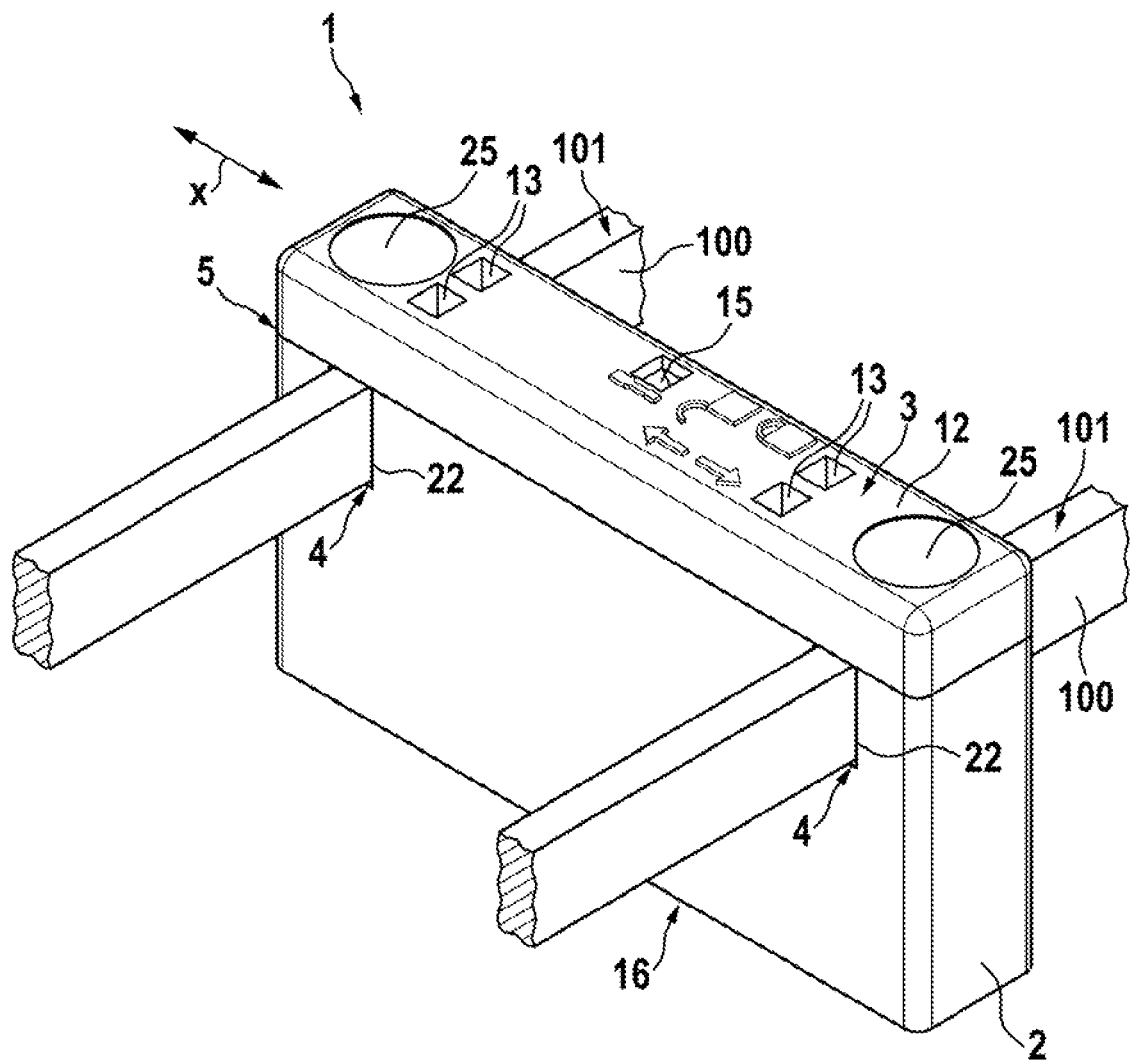
FIG. 1 shows an exemplary arrangement of a busbar holder with two busbars mounted therein.

An exemplary arrangement of two busbars 100, received in a busbar holder 1, is shown in FIG. 1. The busbar holder 1 consists of a top part 3 and a bottom part 2, wherein the busbars 100 each extend through a busbar passage 4 formed between the top part 3 and the bottom part 2 perpendicular to the longitudinal direction x of busbar holder 1 through busbar holder 1. The busbar passage 4 is formed by a busbar receptacle 22 in the bottom part 2 of busbar holder 1 that is covered from above by the top part 3 so that the busbars 100 are held firmly in the busbar receptacle 22. For a press fit of the busbars 100 in the busbar receptacle 22, the busbars 100 can have squeezing ribs 23 (see FIG. 4) on their inner circumference. The busbars 100 extend with their long side of their rectangular cross-section perpendicular to the longitudinal direction x of holder 1. Alternatively, however, they can also extend in the longitudinal direction x of holder 1, wherein in this case the geometry of the passages 4 and receptacles 22 is to be adapted such that one of the long cross-section sides of the busbars 100 aligns with the sliding faces 5 when the respective busbar is inserted in its respective receptacle 22.

The top part 3 and bottom part 2 are connected with each other through a tongue-and-groove connection not visible in FIG. 1, wherein the two parts 2, 3 are displaceable relative to each other in the longitudinal direction x and are mounted to each other in the closed position shown in FIG. 1 through a latching connection provided by a latching pawl (not shown). The latching pawl can be prestressed through a tool insertion opening 15, for example with the aid of a screwdriver, so that the parts 2, 3 in the illustrated longitudinal direction x can be displaced against each other, in particular to move the parts 2, 3 from the closed position shown in FIG. 1 to an open position in which the top part 3 can be lifted from the bottom part 2.

The passages 13 on the upper outer side 12 of top part 3 allow a view into the busbar holder 1 and of the tongue-and-groove connection (not shown), to enable a user in the closed position to visually monitor the proper engagement of the tongue-and-groove connection.

The top part 3 and bottom part 2 border each other along opposite support sides 5, which immediately form sliding faces along which parts 2, 3 can displace against each other in the illustrated longitudinal direction x. In addition, on its outer side 13 each top part on each busbar receptacle 22 has a mark 25 identifying the position of the busbar receptacle 22.

It can also be learned from FIG. 1 that the vertical depth of the busbar receptacles 22 in the direction perpendicular to the outer side 12 of top part 3 correspond precisely to a vertical dimension of the busbars 100, so that when busbar 100 is inserted into the respective busbar receptacle 22 a top profile side 101 of busbar 100 aligns with the support side 5 of bottom part 2. As a result, the top part 3 is also freely movable with inserted busbars 100 within the range of motion along the longitudinal direction x formed by the tongue-and-groove connection and the latching pawl.

The bottom part 2 also has a mounting side 16, through which the busbar holder 1 can be mounted on a base such as a mounting rail or a mounting plate of a switch cabinet housing.

Figure 2:
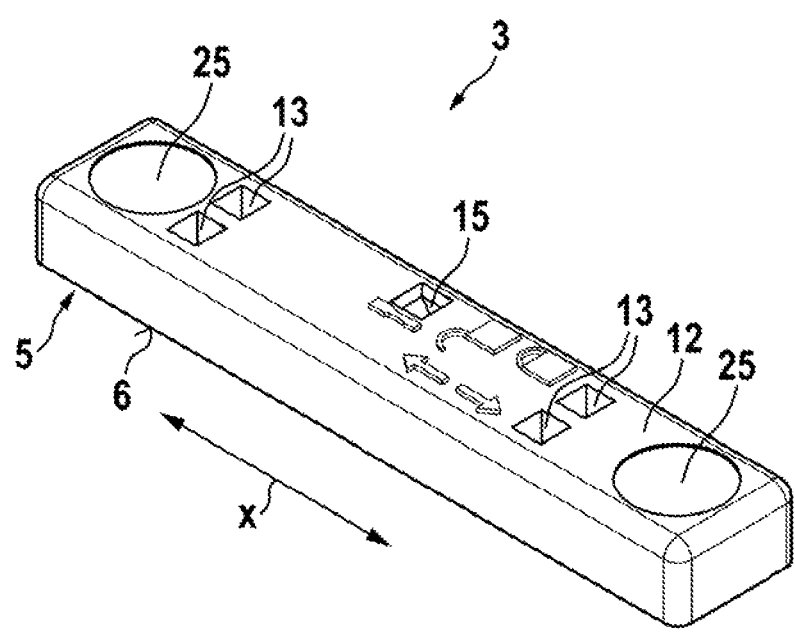
FIG. 2 shows an embodiment of a busbar holder top part in perspective view.

An exemplary embodiment of a top part 3 of a busbar holder is shown in FIG. 2. The top part 3 on its underside has a support side 5 with the level sliding face 6 over which top part 3 can be displaceably set on a sliding face on a support side of a bottom part (not shown) in the longitudinal direction x. The top part 3 according to the embodiment shown in FIG. 1 on its upper outer side 12 has passages 13 through which the fit of a tongue-and-groove connection between the top part 3 shown and a bottom part can be checked. On the same outer side 12 the top part 3 has a tool insertion opening 15 through which a latching pawl of a bottom part, with which the top part 3 shown is combined into a busbar holder, can be prestressed. This makes it possible in particular to again release the latching pawl from its rest position in which the latching pawl engages the bottom part in a recess of the top part 3 on the support side 5, so that top part 3 can be adjusted relative to the bottom part in the longitudinal direction x to loosen the tongue-and-groove connection and top part 3 can be thus lifted from bottom part 2.

Figure 3:
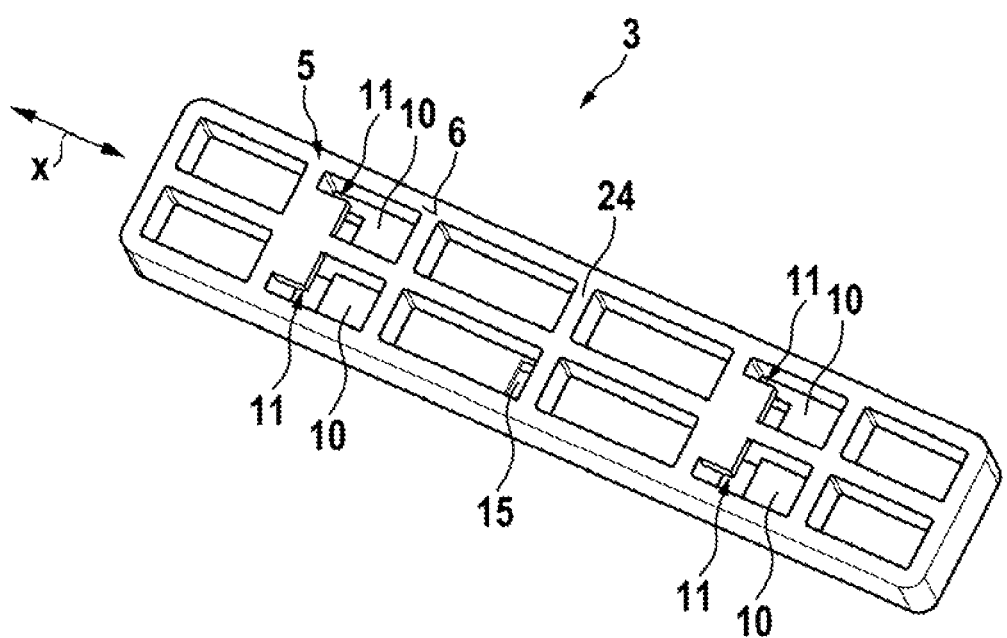
FIG. 3 shows the top part according to FIG. 2 with regard to the support side.

The underside of top part 3 shown in FIG. 2 is shown in FIG. 3. The underside has a support side 5 with a sliding face 6 through which top part 3 can be slidably brought into contact on a corresponding support side and sliding face of a bottom part (not shown). For the tongue-and-groove connection (not shown) to be formed between the top part 3 shown and the bottom part 2, top part 3 has a recess 10 accessible through the support side 5 with an undercut 11. The undercut 11 can be gripped from behind, for example, by a projection on the support side of a bottom part. For this the projection can be designed, for example, as an L-shaped projection.

Figure 4:
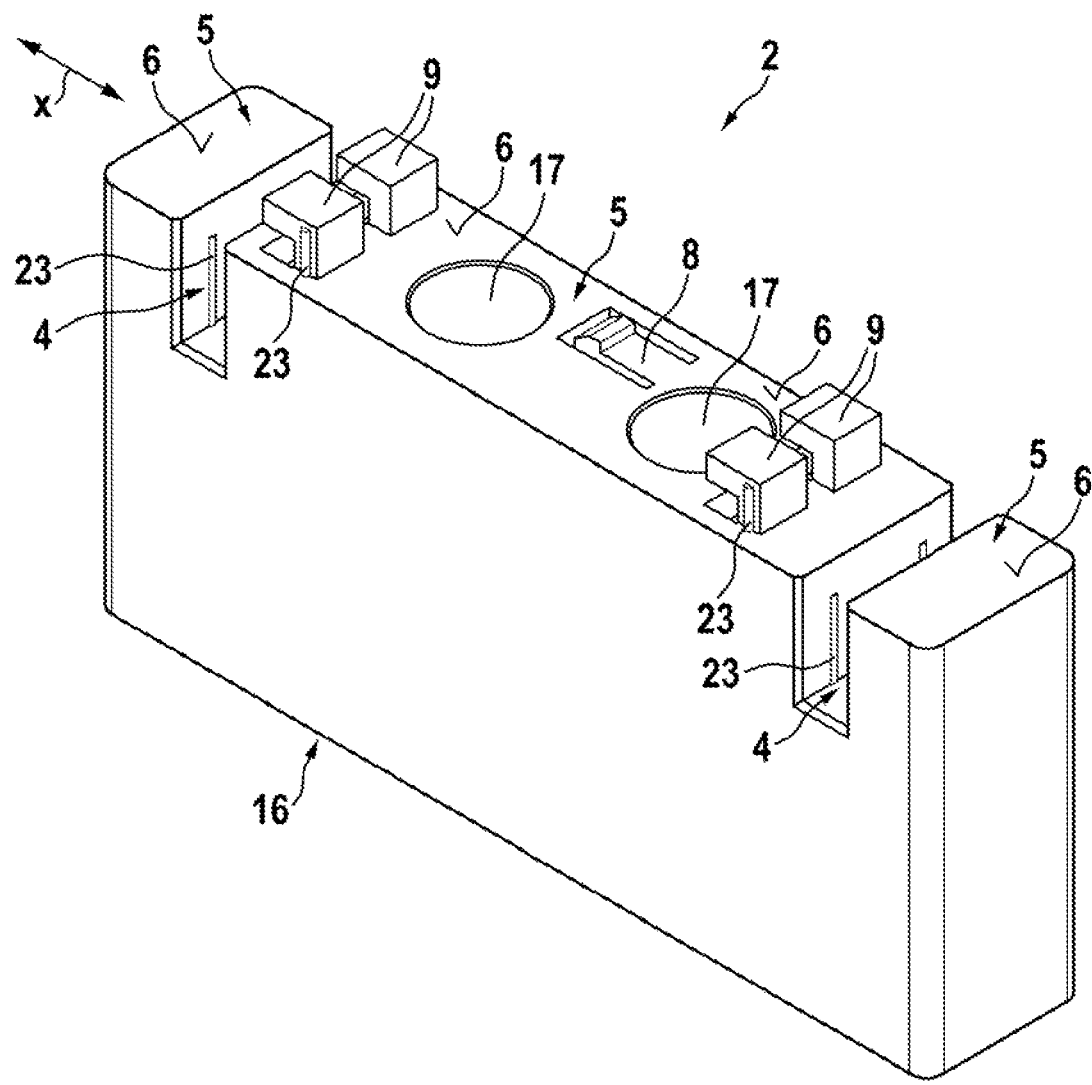
FIG. 4 shows an embodiment of a bottom part in perspective view.

An exemplary embodiment of a bottom part 2, which can also be used in connection with a top part 3 according to FIGS. 2 and 3, is shown in FIG. 4. Bottom part 2 has a mounting side 16 for mounting of the bottom part 2 or the busbar holder on a base, for example a mounting rail. Starting from the support side 5 opposite mounting side 16, a groove-shaped recess extends perpendicular to support side 5 and perpendicular to the longitudinal direction x that forms a busbar passage 4. The depth of the busbar passage 4 perpendicular to the support side 5 can correspond precisely to a dimension of a busbar (not shown) perpendicular to the longitudinal direction, so that the busbar is fully received in the busbar passage 4.

The projections extending from the support side 5 and the sliding face 6 are formed L-shaped, wherein the projections 9 on their free end each have a horizontal crosspiece oriented in the longitudinal direction x. The horizontal crosspieces are connected via vertical crosspieces with outer squeezing ribs 23 to the support side 5.

The support side 5 also has a latching pawl 8 that with its free end projects over the support side 5. The latching pawl 8 is connected by a flexible arm to the body of the bottom part 2 so that the free end of latching pawl 8 can be prestressed perpendicular to support side 5.

Viewing FIGS. 3 and 4 together shows how the tongue-and-groove connection between top part 3 and bottom part 2 is formed. When top part 3 is set on bottom part 2, the bottom part with its projections 9 extends into recesses 10 of top part 3. By shifting top part 3 and bottom part 2 in the longitudinal direction x, the free ends of projections 9 grip the undercuts 11 of recesses 10 from behind so that top part 3 is mounted to bottom part 2. In a closed position in which projections 9 grip undercuts 11 from behind, latching pawl 8 of bottom part 2 can grip central web 24 of top part 3 from behind so that top part 3 and bottom part 2 in the longitudinal direction x are mounted immovably to each other. In this closed position latching pawl 8 can be pre-tensed through tool insertion opening 15 to release latching pawl 8 from central web 24 so that the parts 2, 3 are again displaceable to each other in the longitudinal direction x and can thus be moved to the open position in which top part 3 can be lifted from bottom part 2.

The squeezing ribs 23 on the outer sides of projections 9 sit in the press fit on the inner circumference of recesses 10 in support side 5 of top part 3 so that top part 3 and bottom part 2 also in the open position already are presecured so that a certain security against loss of top part 3 and bottom part 2 is provided.

Figure 5:
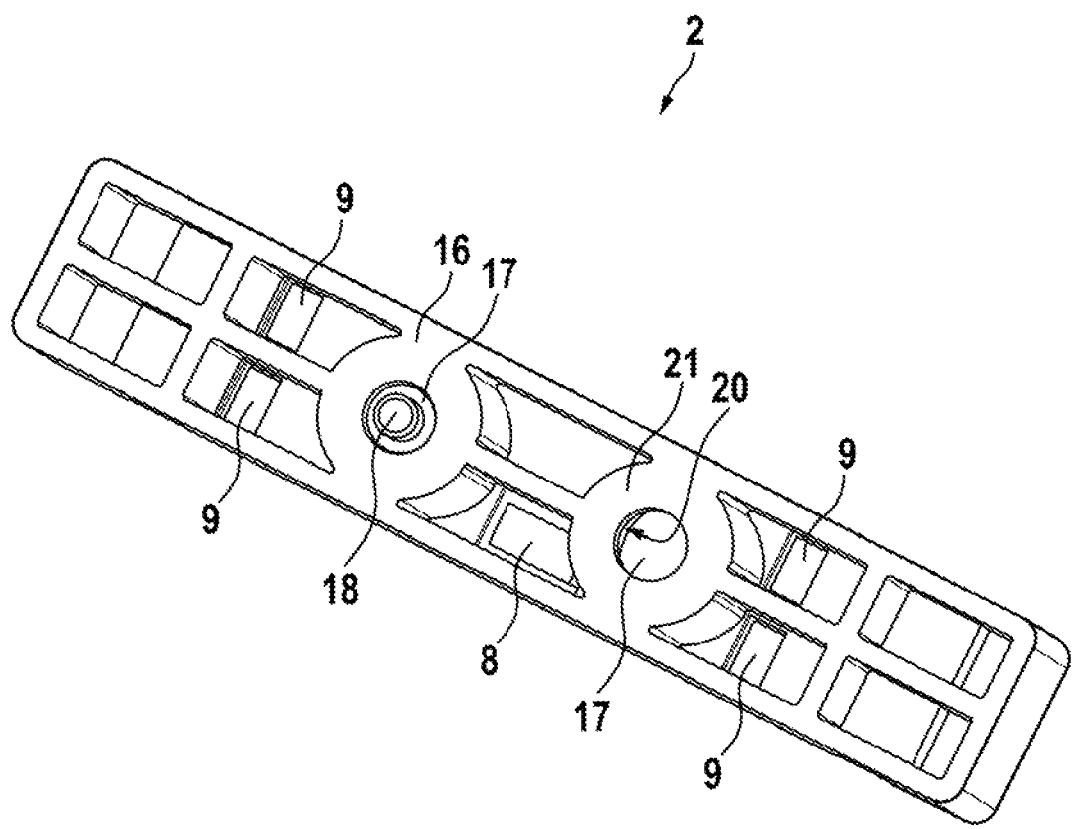
FIG. 5 shows the bottom part according to FIG. 4 with regard to the support side.

FIG. 5 shows the underside of top part 2 according to FIG. 4, wherein this provides a view of the mounting side 16 of bottom part 2. Through mounting side 16, bottom part 2 can be brought into contact on a random base, such as a mounting plate or a mounting rail. For the pre-alignment of the busbar holder or bottom part 2 with respect to the base, bottom part 2 has a positioning pin 18 that projects over mounting side 16. For mounting bottom part 2 on the base, bottom part 2 with positioning pin 18 can be inserted into a first mounting hole in the bases for the later mounting of bottom part 2 so that the other screw channel 17 is already pre-positioned with respect to another mounting aperture. After a first screw connection between bottom part 2 and the base has been created through this other screw channel 17, positioning pin 18 can be broken out of screw channel 17 and subsequently the screw channel 17 that has become free can be used for creating another screw connection with the bases.

Figure 6:
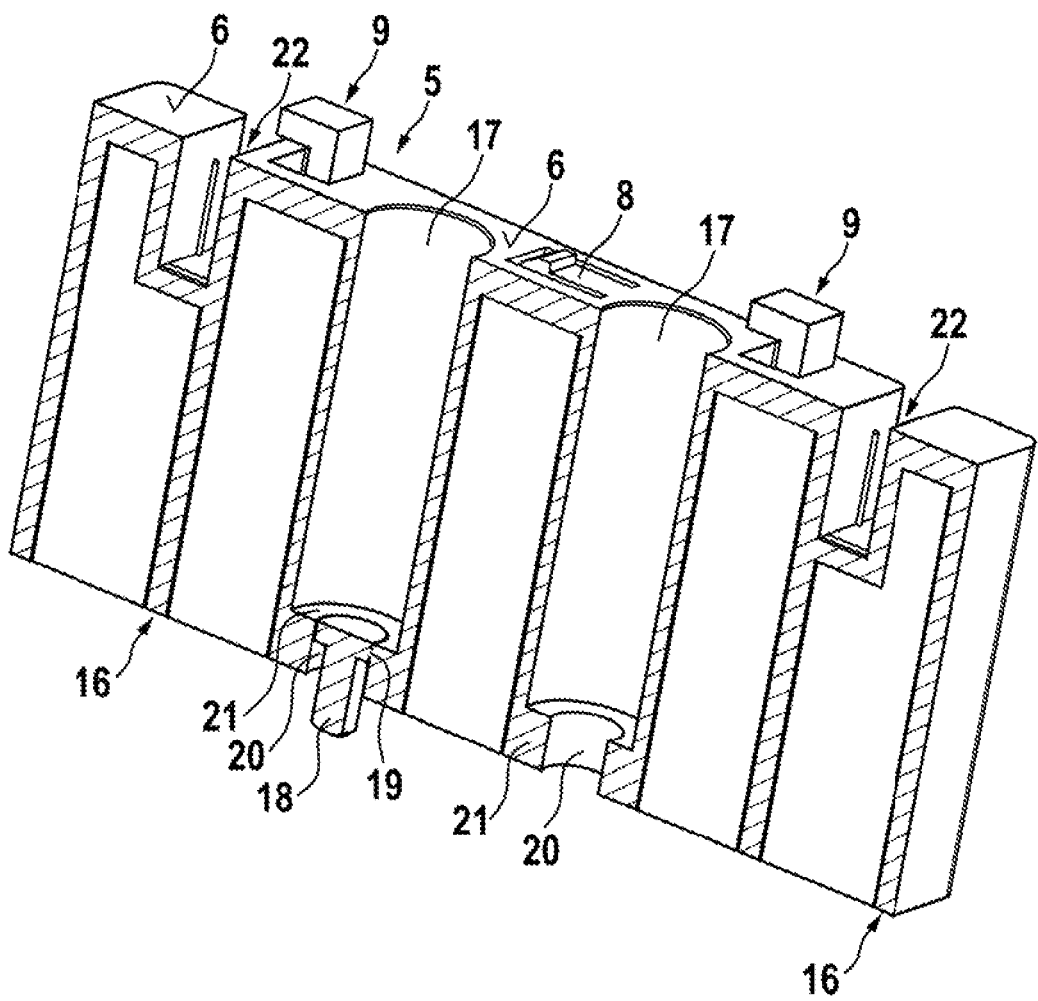
FIG. 6 shows a perspective longitudinal cross-section of the bottom part according to FIGS. 4 and 5.

Other details of this are shown in FIG. 6. In particular, positioning pin 18 can be mounted through a predetermined breaking point 19 on inner circumference 20 of an annular flange 21 arranged on one end facing mounting side 16 of one of screw channels 17.

Figure 7:
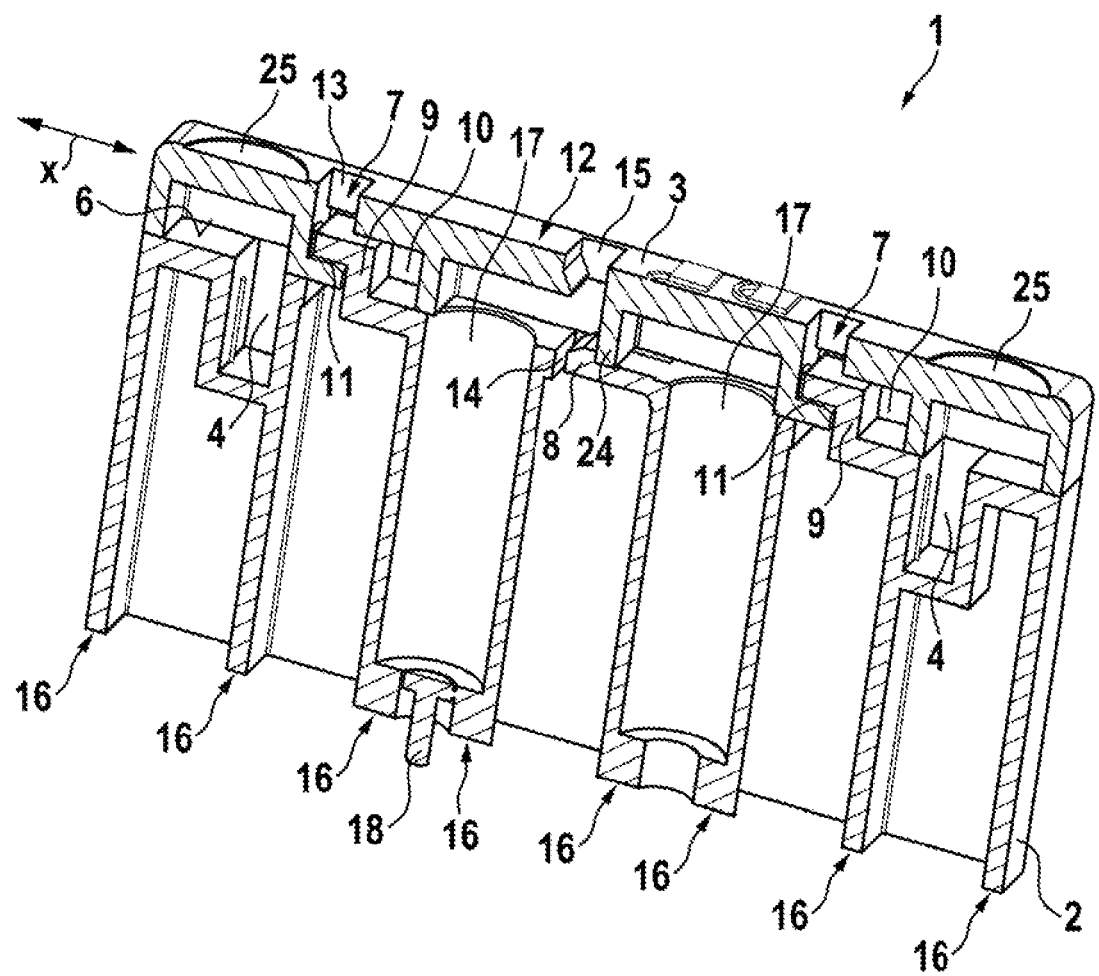
FIG. 7 shows an embodiment of a busbar holder in perspective longitudinal cross-section.

The view according to FIG. 7 illustrates the interaction of bottom part 2 with top part 3 of an embodiment of a busbar holder 1 if it is in the closed position. A frictional connection between the parts 2, 3 is created through two tongue-and-groove connections 7. For fixing the two parts 2, 3 in the closed position shown, a latching pawl 8 of bottom part 2 grips a central web 24 of top part 3 from behind. Through passages 13, the area of undercut 11 of recesses 10 is visually accessible so that in the closed position it can be monitored by a user whether the projections 9 of bottom parts 2 properly grip the respective undercut 11 from behind so that a secure connection of parts 2, 3 is guaranteed. Through a tool insertion opening 15, a latching receptacle 14 in top part 3 is accessible that latching pawl 8 engages with its free end. With a tool, such as a screwdriver, the free end of latching pawl 8 can be prestressed until the free end of latching pawl 8 no longer grips central web 24 from behind so that upper part 3 can be shifted relative to bottom part 2 in the longitudinal direction x, more precisely in the representation according to FIG. 7 to the left, so that the two parts 2, 3 assume the open position in which projections 9 no longer grip from behind the undercuts 11 of recesses 10 so that top part 3 can be lifted from bottom part 2 perpendicular to the outer side 12.

The features of the invention disclosed in the above description, in the drawings, and in the claims can be essential both individually and in any combination for the realization of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A busbar holder comprising a bottom part and a top part detachably connected with bottom part, between which, if they are connected with each other, at least one busbar passage is formed, wherein the top part and the bottom part have sliding faces on opposite support sides along which they bear against one another between an open position in which the top part can be lifted from the bottom part and a closed position in which the top part is mounted to the bottom part through a tongue-and-groove connection, the top part and bottom part being displaceable relative to each other, wherein a releasable latching pawl mounts the top part and the bottom part in the closed position, the releasing mounting pawl being located on a central portion of the support side of the bottom part, and wherein the bottom part has a mounting side opposite its support side for mounting of the bottom part on a base, wherein a screw channel extends between the support side and the mounting side of the bottom part and wherein a positioning pin projects from the screw channel and protrudes over the mounting side.

2. The busbar holder according to claim 1, wherein the tongue-and-groove connection is formed as at least one T-shaped or L-shaped projection that extends from the support side of the part of top part and bottom part having the T-shaped or L-shaped projection.

3. The busbar holder according to claim 2, in which the T-shaped or L-shaped projection extends into a recess of the respective other part of top part and bottom part, wherein the T-shaped or L-shaped projection in the closed position grips from behind an undercut of recess, and wherein the T-shaped or L-shaped projection in the open position is isolated relative to undercut.

4. The busbar holder according to claim 2, in which the part of top part and bottom part having recess have on an outer side a passage that opens into the undercut.

5. The busbar holder according to claim 1, in which the releasable latching pawl projects from a first of the two opposite support sides and in the closed position is received in a latching receptacle in a second of the two opposite support sides.

6. The busbar holder according to claim 5, in which the part of top part and bottom part having the latching receptacle on an outer side has a tool insertion opening that opens into latching receptacle.

7. The busbar holder according to claim 1, in which positioning pin is mounted detachably in mounting side and preferably mounted through a predetermined breaking point.

8. The busbar holder according to claim 7, in which positioning pin is mounted through a predetermined breaking point on the inner circumference of an annular flange, which is arranged inside screw channel bordering on mounting side and preferably aligned with mounting side.

9. The busbar holder according to claim 1, in which the top part on its outer side for each busbar receptacle has a mark identifying the position of busbar receptacle.

10. The busbar holder according to claim 1, in which the cross-section of the at least one busbar passage is formed by the cross-section of a busbar receptacle in bottom part, wherein busbar receptacle is closed by support side of top part if top part and bottom part are connected with each other.

11. An arrangement of a busbar holder according to claim 10 and a busbar that is inserted into the busbar receptacle in bottom part, wherein an outer profile side of busbar aligns with sliding face of bottom part and rests on sliding face of top part if top part and bottom part are connected with each other.

12. A busbar holder comprising:
a bottom part and a top part detachably connected together forming a busbar passage;
the bottom part having a support side engaging the top part, the bottom part further including a mounting side opposite the support side for mounting to a base;
the bottom part further including first and second screw channels adjacent to each other and extending from the support side to the mounting side;
a detachable positioning pin in the first screw channel protruding from the mounting surface; and
the positioning pin being configured to engage a hole in the base to assist in aligning the second screw channel with another hole in the base such that a screw can extend the through the second screw channel and into the base, with the positioning pin thereafter being detachable so that another screw can extend through the first screw channel and into another hole in the base after the positioning pin has been removed.

13. The busbar holder of claim 12 wherein the positioning pin is configured to be broken away.

* * * * *